June 24, 1930.　　　C. E. DUNN　　　1,767,520
SHOCK ABSORBER
Filed April 17, 1925　　4 Sheets-Sheet 1
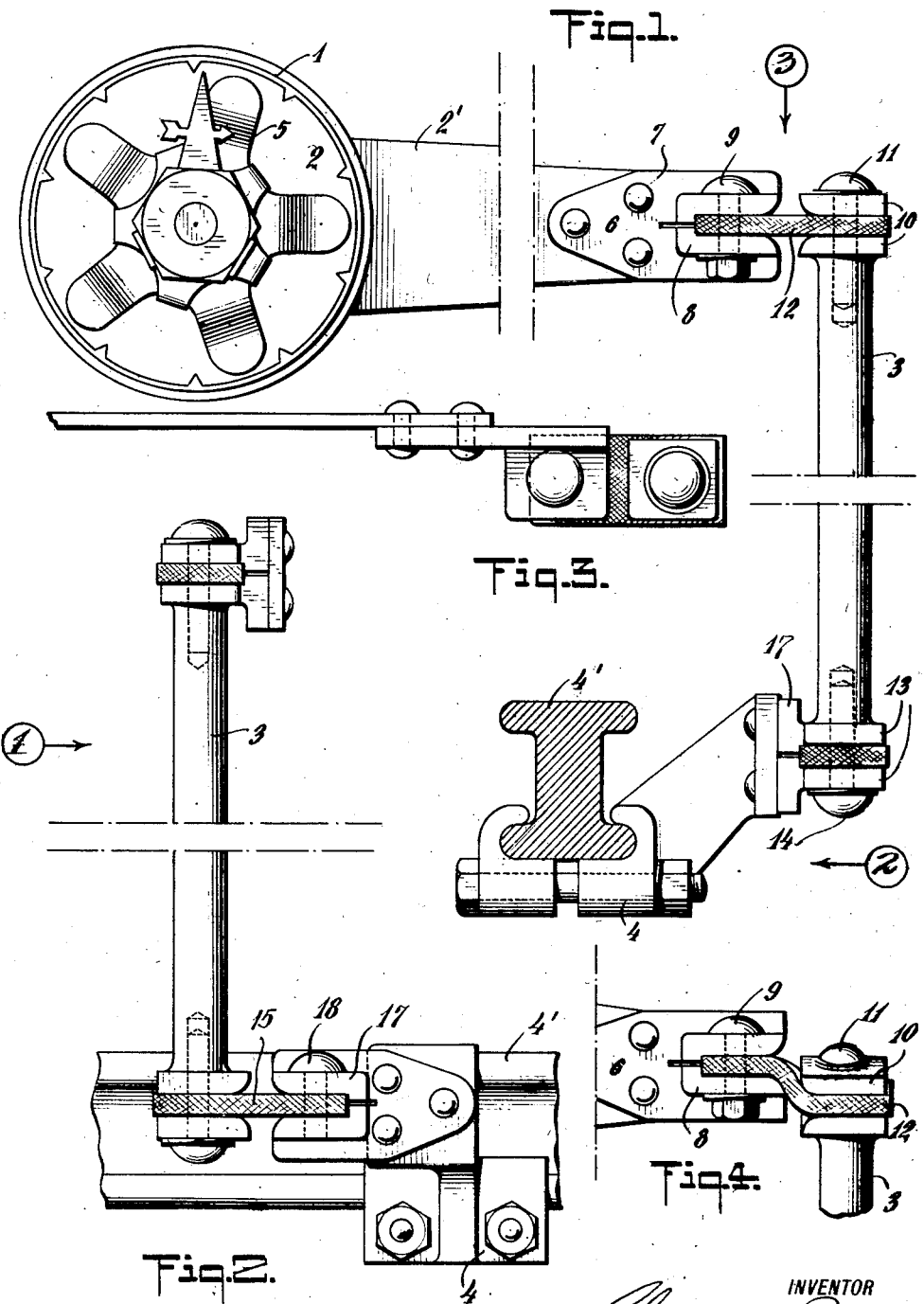
INVENTOR

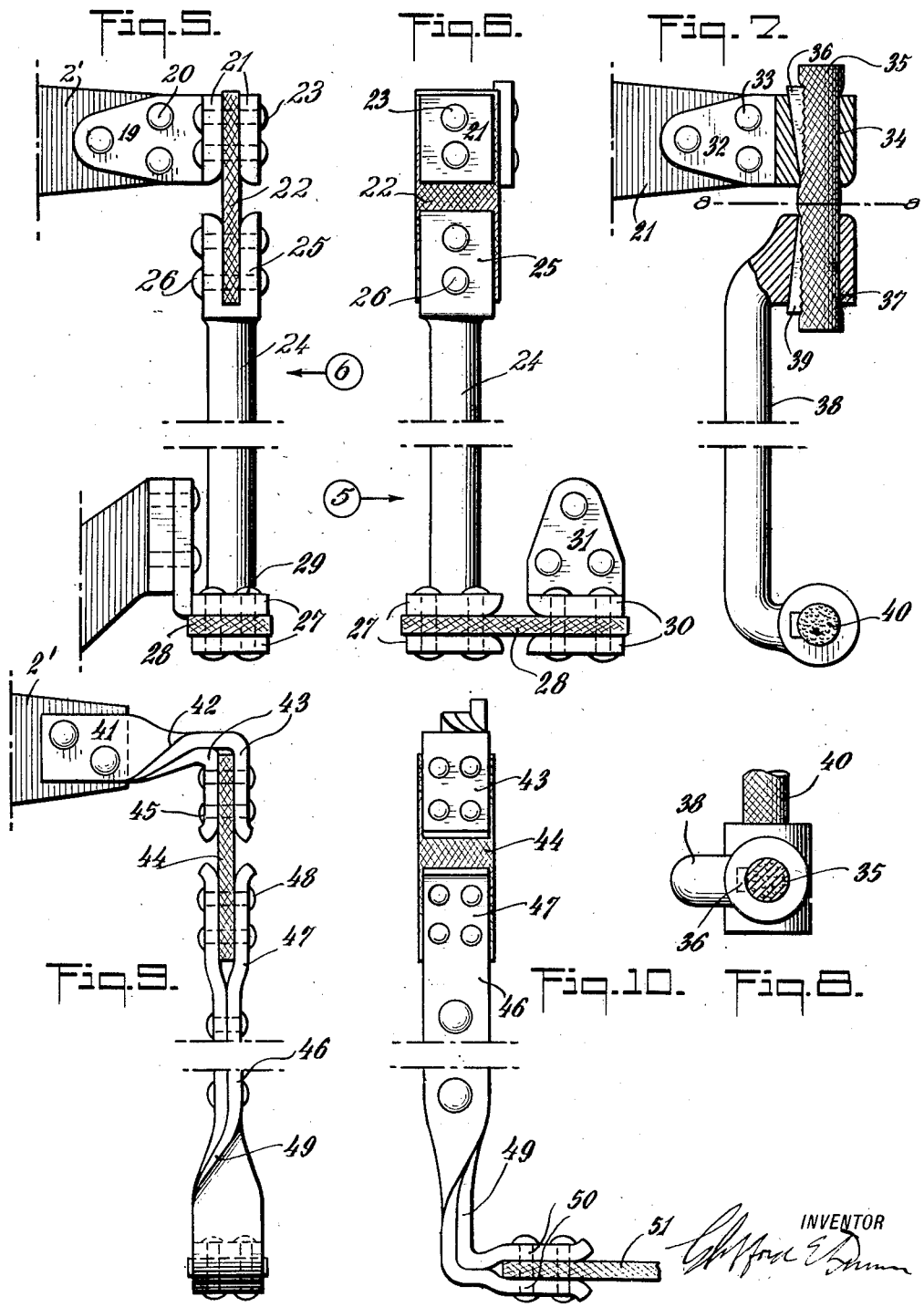

June 24, 1930.　　　C. E. DUNN　　　1,767,520
SHOCK ABSORBER
Filed April 17, 1925　　　4 Sheets-Sheet 3
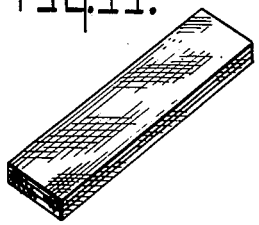
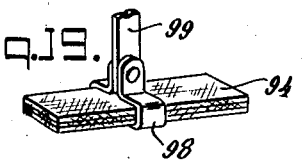
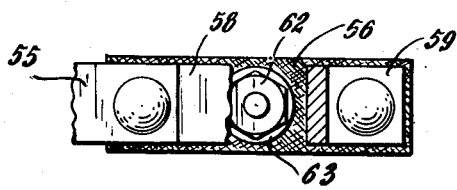
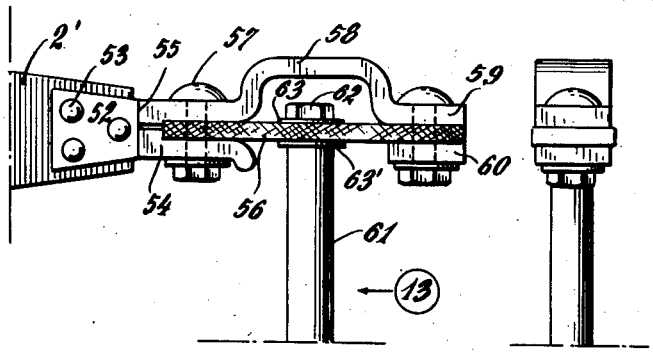
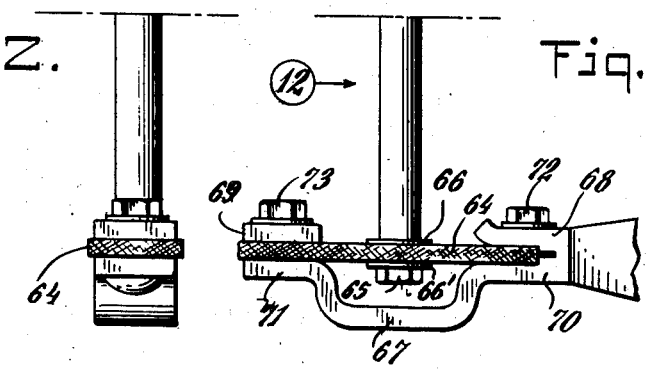
INVENTOR June 24, 1930. C. E. DUNN 1,767,520
SHOCK ABSORBER
Filed April 17, 1925 4 Sheets-Sheet 4
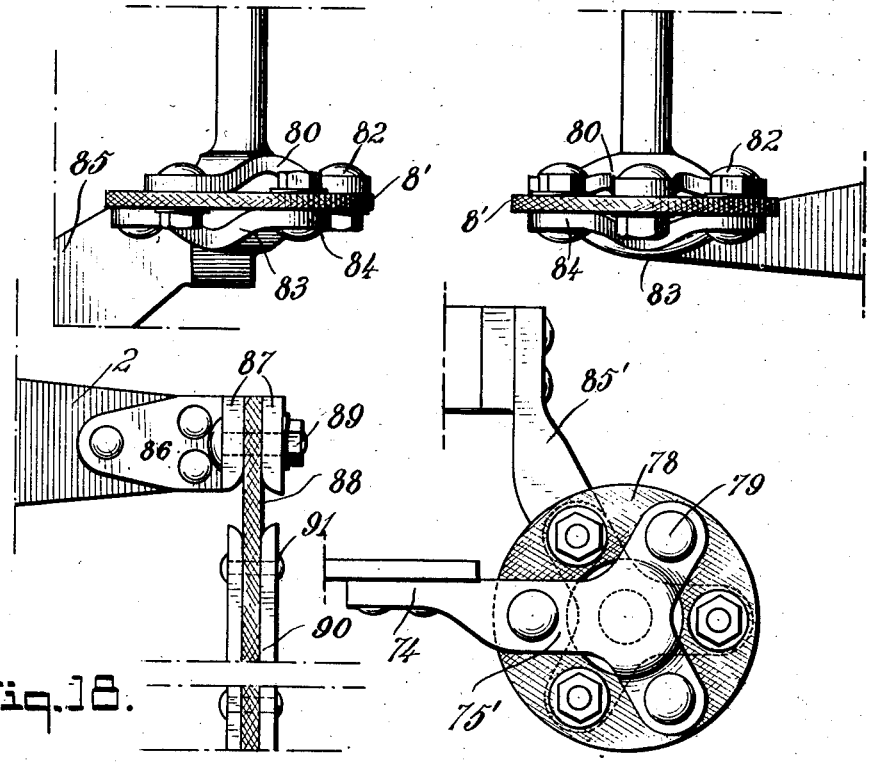

Patented June 24, 1930

1,767,520

UNITED STATES PATENT OFFICE

CLIFFORD E. DUNN, OF SHORT HILLS, NEW JERSEY

SHOCK ABSORBER

Application filed April 17, 1925. Serial No. 23,802.

This invention relates to improvements in shock absorbers for spring equipped vehicles, especially motor vehicles.

In motor vehicle construction it is well known that the suspended parts, which are usually connected by means of laminated springs, have a relative movement due to the deflection of the springs when the vehicle is passing over undulations or other irregularities in the roadbed. These relative movements are of different degrees of intensity and, when the vehicle traverses a roadway which has depressions or other irregularities in its surface, the relative movements of the suspended parts are frequently of a severity and duration which cause considerable discomfort to the occupants of the vehicle and also produces undue wear and tear in the various mechanisms of the latter.

Therefore, to counteract the forces liberated by the vehicle spring action, it has been the practice to provide various forms of controlling devices whereby the compression and recoil of the springs may be governed and vibration reduced in both vertical and horizontal planes so as to minimize the shocks and jars transmitted to the suspended parts.

An important object is to provide a brake for controlling or retarding the objectionable spring vibrations and at the same time, a satisfactory shock absorber must be so connected to the respective vehicle parts that it will perform its proper function, and at the same time, permit the springs to perform their intended functions with as little interference as possible. For instance; leaf or laminated springs have their chief vibrations in a vertical direction; at the same time, a vehicle body suspended on such springs may have some slight movement fore and aft. In addition some lateral sway frequently takes place and while a shock absorber should control each and all of these vibrations they should be so connected to the vehicle parts that they do not constitute a positive stop or check for such movement. Shock absorbers, as at present used have employed various types of connecting means between the reciprocating member and the friction arm, such as a ball and socket joint or a metallic universal joint, which types of connecting means readily provide for a longitudinal movement of the reciprocating member collateral to the vertical movement of the friction arm, when the springs are vibrating, but which allow but little play for any lateral movement of the springs. As a result of this, an excessive side lurch of the vehicle obviously results in either a cracking of the ball and socket joint, or a twisting thrust on the friction member of the shock absorber, which tends to bend, and to cause excessive wear at its friction contact portions. Continual side sway of the vehicle body and the springs thereon obviously produces a gradual wearing of the metallic joint and the friction contact portions cooperating with the friction arm, with the result that the moving parts of the device require frequent removal and that the life of the shock absorber is greatly diminished.

Shock absorbers, and especially those of the constant friction type, frequently fail to give a maximum efficiency for the reason that if the frictional retarding mechanism is adjusted sufficiently tight to produce the desired retarding action upon a comparatively large oscillation of the spring, this retarding action may be excessive for controlling the smaller oscillations due to slight inequalities in the road bed, and conversely, if it is adjusted for the smaller vibrations, it will not sufficiently control the greater oscillations. This difficulty has been long recognized and shock absorbers having two or more degrees of friction have been designed and used, but such structures involve considerable complications and expense in their manufacture, and it is an important object of my invention to provide a structure which will serve every reasonable purpose, and at the same time, be simple in operation and inexpensive.

The general object of the present invention is to provide a shock absorber of a simplified construction, whereby it may be more economically produced and at the same time, will possess a higher degree of durability than has heretofore been attainable in anti-vibration devices of the various types.

Again, it is aimed to provide a flexible jointure means between the friction arm and a drag-link of a shock absorber, whereby the motion of the drag-link in the lateral plane, as well as in the vertical plane may be compensated, without causing any frictional wear on the connecting parts.

Further, it is aimed to provide a jointure means between the drag-link and the spring connecting means for allowing a lateral movement between the two, simultaneously to and collateral with the vertical movement of the drag-link.

Still further, it is aimed to provide a heavy, flexible, multi-ply fabric as the jointure means between the respective movable members, the fabric being adjustable as to the lengths thereof required.

Still further, it is aimed to provide the jointure means in planes perpendicular to one another in a shock absorber, whereby to provide a relative movement, both lateral and longitudinal, of the friction arm connecting member, without effecting the vertical movement of the said connecting member, due to the vibration and recoil of the spring.

Still further, it is aimed to provide a lost motion connection of the movable parts of a shock absorber, whereby small vibrations in any plane, especially the vertical plane, of the vehicle spring will not be transmitted to the resistance mechanism of the shock absorber.

These and other advantages, capabilities and features of the invention will appear from the subjoined detailed description of certain specific embodiments of my invention, as illustrated in the accompanying drawings, in which Fig. 1, represents a side elevation of one form of my invention.

Fig. 2, represents a front elevation of the drag-link connecting mechanism indicated at 2 in Fig. 1.

Fig. 3, is a plan view of the joint indicated along lines 3—3 of Fig. 1.

Fig. 4, is a side elevation of the structure shown along the lines 3—3 of Fig. 1, but with the members in their position of extreme movement.

Fig. 5, represents a side elevation of a modification of the jointure.

Fig. 6, represents a front elevation of the structure shown in Fig. 5.

Fig. 7, represents a further modification of the jointure indicating a different flexible joint.

Fig. 8, is a plan view of the structure shown in Fig. 7, looking down along lines 8—8.

Fig. 9, represents a side elevation of a further modification.

Fig. 10, represents a front elevation of the modification shown in Fig. 9.

Fig. 11, represents an isometric projection of the fabric used in the joints.

Fig. 12, represents a side elevation of a still further modification.

Fig. 13, represents a front view of the structure shown in Fig. 12.

Fig. 14, represents a plan view of the structure shown in Fig. 13.

Fig. 15, represents a side elevation of a still further modification.

Fig. 16, represents a front elevation of the structure shown in Fig. 15.

Fig. 17, is a plan view of the structure shown in Fig. 16, looking downwardly.

Fig. 18, represents a side elevation of a still further modification of the invention.

Fig. 19, represents a side elevation of a still further modification of the invention.

Referring now more particularly to the reference characters in the drawing, numeral 1, represents a general type of friction device for shock absorbers as shown in the Hartford Patent No. 1,401,252, in which a plurality of friction members are positioned, one of which has an integral arm 2' extending therefrom. The outer friction members are fixed on a shaft, which shaft is attachable to a frame of a vehicle. The extending arm 2' of the friction disc 2 has a movement in a vertical direction. Friction discs or washers are located between the members and as shown in Fig. 1, the respective members of the friction device 1 are maintained under any required tension by means of a spider spring 5 and a bolt and nut. These features have all been well known in the art and are shown clearly in the Hartford patent above mentioned.

At the extremity of the arm 2', there is formed a bracket 6 fastened thereto by bolts or rivets 7, which bracket has a plurality of offset flanges 8 extending perpendicularly therefrom. These flanges are made of metallic or non-metallic material and may be made capable of yielding slightly to any excessive movement in any plane. Between these flange members 8 there is adapted to be positioned a length of multi-ply fabric or other flexible material 12, which is fastened directly to the flange sections which are pressed towards one another and clamp it tightly therebetween. A bolt 9 extending transversely of the flanges is forced through the flexible material to form an auxiliary fastening means in conjunction with the tightly compressed flange sections surrounding the fabric. The other end of the flexible fabric member 12 is contained between a plurality of similarly enveloping flange members 10 on the drag-link member 3, the said fabric being retained in fixed relation between the opposing flange members which members may also be flexible so as to allow the greatest lateral or twisting movement of the fabric without any tear or stress thereon. At the base of the drag-link member there is formed a second series of flange sections 13, which sections are parallel to the flange sections 10, but in a plane 90° from that of the flange members 6. Between these flange sections 13, there is fastened, due to the clamping action of each of the flange sections, a second fabric 15, which fabric is similar to that shown in the brackets 8 and 10 but which is placed in a plane parallel to the first named fabric, but extending at right angles thereto, whereby to compensate for any movement of the drag-link in a plane lateral to the movement of the shock absorber device. A bolt 14 passing into a threaded portion of the drag-link member, and transversely through the flange sections 13, serves as an auxiliary support for the fabric between the flange. This fabric 15 is attachable at its opposite end to a plurality of flange sections 17 on a bracket 16 which is attachable to frame gripping means 4. This frame gripping means may be adjustable and may be fitted to any type of structural beam 4' or to fit about any type of spring member, the fastening for the fabric on the flexible flange sections 17 being carried out by means of the clamping action of the plural portions of the flange sections and with the aid of the auxiliary fastening means consisting of a bolt passing transversely through the flanges and fabric.

In the showing in Fig. 4, there is indicated the advantages of the flexible joint formed by the fabric 12 between the respective bracket sections 8 and 10. As seen in this view, the fabric can be readily bent a considerable distance without affecting or causing movement to the friction arm 2' which controls the resistance offered by the shock absorber to the movement of the springs. In other words, when a slight bump is encountered by the vehicle, there is no necessity for any action of the shock absorber, and, consequently, the flexible fabric members 12 and 15, by a movement as shown in Fig. 4, which movement is really one of the lost motion type as regards the active resistance elements of the friction shock absorber, can compensate for the movement of the spring.

In the showing of Fig. 5, the friction arm 2' has at its end a bracket member 19 which is fastened thereto by means of bolts 20. Offset from this bracket member there is a plurality of flanges 21 at right angles thereto, between which a fabric 22 is adapted to be positioned, the fabric being clamped between the flanges which are compressed thereon from opposite sides, and further fastened transversely of and to said flanges by means of bolts 23. As shown in Figs. 5 and 6, the upper fabric member between the upper section of the drag-link 24 and the extremity of the friction arm 2' is adapted to be placed in a perpendicular plane, the lower end of said fabric being fastened between a plurality of flanges 25 at the upper end of the drag-link 24 by the clamping pressure applied through the opposing flange augmented by the transversely mounted bolts passing through the flange and fabric. At the base of said drag-link 24 there is formed a plurality of offset flanges 27 at right angles to said drag-link and between which there is adapted to be fastened a second multi-ply fabric member 28 by means of the clamping action of said flanges and of bolts 29. This fabric member is adapted to have its other extremity fastened between the flanges 30 of a bracket member 31, which bracket member is fixed to the spring or the axle supporting the spring in any desired manner, one method of which is shown in Fig. 1.

In the showing in Figs. 7 and 8, the friction arm 2' has at its extremity a bracket 32 attachable thereto by bolts 33. This bracket has formed at its extremity an opening 34 into which a multi-ply fabric 35, herein shown as tubular, may be fitted. To maintain this tubular fabric member within the opening 34, a key member 36 is adapted to be forced into the opening so as to press firmly against the fabric member. The lower portion of said fabric member 35 is similarly fixed within an opening 37 in a curved drag-link 38 by means of a key 39. Noting the lower portion of said drag-link member, it is observed that the second tubular fabric member 40 extends perpendicularly to the first tubular fabric member 35 but in a different direction.

In the modification shown in Figs. 9 and 10, the friction arm 2' has at its extremity a bracket 41, which bracket is twisted as at 42 so as to form a plurality of depending flanges 43 integral therewith. Between the flanges 43 there is adapted to be positioned one end of a multi-ply fabric 44 by means of the clamping action of the plural metallic or non-metallic flanges and the passage transversely therethrough of the bolts 45. The lower end of said fabric member is attachable to the drag-link member 46 by means of a plurality of slightly flexible clamping flanges 47 through which passes bolts 48. The drag-link member 46 is twisted at its base, as shown at 49, so as to form a plurality of flanges 50, between which flanges there is adapted to be positioned a second fabric member 51 in a plane perpendicular to the first member 44. It should be noted that the drag-link member here is formed of flexible stamped metal which can be twisted in the stamping operation.

In Fig. 11 there is shown one type of the fabric which is adapted for this invention. Although it is herein shown as having three plies, it is understood that the number of plies, the arrangement of plies and the configuration of the strip is not limited to this detail, it being well within the province of the inventor to modify.

In the modification shown in Figs. 12, 13, and 14, the friction arm 2' has at its extremity a bracket member 52 fastened thereto by means of bolts 53. Extending from this bracket member 52 there are formed two flanges 54 and 55, between which one end of the fabric 56 is fastened by means of a bolt 57. The flange 55, however, may be of slightly flexible metal and is formed in the shape of a yoke as at 58, being longer than the flange 54. This type of yoke can readily take up any slight twisting side movement due to its flexibility. At the extremity 59 of the yoke 58 there is attachable to the other end of the fabric member 56, a second flange member 60 being adapted to be positioned adjacent the extremity 59 of the yoke, and a bolt being inserted through said members 59 and 60 whereby to fix the fabric 56 therebetween firmly. At the central portion of the fabric member 56 or at any other portion desired within the area of the yoke 58, there is fixed the drag-link member 61, this said drag-link member being attachable by means of a screw 62 which screws into the drag-link member and forces the fabric between two washers 63 and 63' at the extremity of the drag-link member 61. The base of the drag-link member 61 is similarly attached to the second fabric member 64 by means of the bolt 65 which fixes the said fabric member between the two washers 66 and 66'. This fabric member 64 is positioned between the yoke member 67 and two flange members 68 and 69 cooperating, respectively, with the offset portions 70 and 71 of the yoke, the means of fastening here being indicated as bolts 72 and 73. The yoke, as shown in the lower part of Fig. 13, is attachable to the clamping means which are adapted to be fixed to the axle or spring member (not shown).

In the showing in Figs. 15 to 17, inclusive, there is indicated a novel modification of my device. To the extremity of the friction arm 2' there is fixed a bracket member 74 which is fastened thereto by means of bolts 75. This bracket member 74 has formed at its extremity a spider member 75' consisting of three arms. The drag-link member 76 has at its upper extremity a spider member 77 consisting of three arms similar to those on the bracket 74 but positioned in different vertical planes. The fabric member 78 is adapted to be positioned between the respective spider members which do not coincide. The fabric is fixed to the respective spider members 75 and 77 at six distinct points in this modification, that is, bolt members 79 are adapted to be positioned between each arm of the spider members and the fabric 78. In this manner, six different points of connection are provided, although applicant is not limiting himself to a specific number of spider arms, nor to the specific form of attaching the fabric to said arms, the feature of this embodiment being that in the movement of the drag-link, in either the lateral or the horizontal plane, the fabric will always be flexed independently of the motion in a vertical plane of the friction arm. The drag-link member 76 has at its lower portion a second spider member 80 which consists of three arms to which a second fabric member 81 is adapted to be fixed by means of bolts 82. The fabric is attached to a spider member 83 by means of its arms 84, which spider member is adapted to be fixed or attachable in any well known manner, to an axle or spring clamping member 85, of which a complete view is not herein shown.

As is indicated in Fig. 17, the spider arms of the friction arm and the drag-link, respectively, in being fixed to the annular fabric members 78, forms a true universal joint since motion of the drag-link member 76 or the friction arm which is not in a vertical plane results in the twisting of the fabric which is flexible. In this manner, a lateral or side twist of the spring, when transmitted through the spring clamping means to the drag-link member and thence to the friction arm, will not affect the shock absorbing friction device but will in itself through its flexibility compensate for this side sway, by being displaced in a twisting movement.

In the showing in Fig. 18, the friction arm member 2' has attached at the end thereof a bracket 86 having flexible flange members 87 to which a length of multi-ply fabric 88 is attachable by the clamping pressure exerted by the flange when augmented by pressure transversely of the flange member, by means of bolts 89. The drag-link member 90 as herein shown has a plurality of plates attachable to this length of fabric by means of bolts 91. This fabric extends down the entire length of the drag-link member and is twisted as at 92 in a plane perpendicular to the upper portion thereof to be attachable to flanges 93 which are fixed to the spring or axle clamping member, not shown. This modification is particularly directed to a flexible joint, part of which consists of the flexible reinforced drag-link member, but which is adapted to carry out the operation similar to those of the other embodiments shown on account of its being positioned in two planes independent of one another, but perpendicular to one another.

In the showing in Fig. 19 there is indicated a still different type of flexible connecting means. The flexible fabric 94 which is clamped between plural flange members of a yoke (not shown) and attachable to the spring clamping means, as shown in Figs. 12 and 13, is surrounded by a slightly flexible strap 98, which strap passes around the central portion thereof in a place perpendicular thereto and is attached at its end to the drag-link member 99. This modification is similar to that shown in Figs. 12 and 13, the difference being only in the replacement of the bolt clamping means 62 and 66 cooperating with the drag-link member 61, by flexible metallic or non-metallic strap member fitting tightly to and enclosing the flexible fabric member 94. Though the fabric is herein indicated as being held between tightly clamping flexible flanges, having bolts passing transversely therethrough to augment the flanges in maintaining the fabric in fixed relations at the ends thereof, it is well within the province of the invention to allow the flanges to be of rigid material, and cause the bolts passing therethrough to maintain the fabric in position.

From the foregoing description, it will be seen that certain forms of the invention are directed to forming flexible jointure means between the drag-link member of a shock absorber and the friction arm member and the axle or spring clamping members. By this means very slight motion imparted to the clamping member by the motion of the axle or spring will be compensated by the flexing of the fabric without any effect upon the friction arm member. In other words, the shock absorber will not be put into play, since springs are perfectly capable and should be allowed to compensate for slight movements or variations of movements of the vehicle.

Further, in case of a side sway of the vehicle, which sway is transmitted to the clamping member attachable to the spring or axle, the drag-link connected thereto by means of these flexible joints will be caused to sway in a lateral plane due to the flexibility of the joints without straining or moving the friction arm 2' or the friction disc 2 at the opposite extremity of said arm. This last named function of this joint eliminates any wear on the friction disc 2, since the only movement which this friction disc undergoes is that of a frictional reciprocation influenced by the vertical movement of the springs.

It is obvious that the invention may be embodied in many forms and constructions, and I wish it to be understood that the particular forms shown and described are but a few of the many forms possible. Various modifications and changes being possible, I do not limit myself in any way thereto.

What is claimed is:

1. In a shock absorber, the combination with a plurality of friction elements, of an arm extending from one of said friction elements, a bracket at the extremity of said arm, flanges on said bracket, a flexible fabric, means for fixing one end of said fabric between said flanges, a drag-link, flanges on said drag-link, means for fastening the other end of said fabric on said drag-link whereby to provide a flexible joint between said arm and said drag-link, a second flange on said drag-link at the opposite end thereof and perpendicular to said first flange, a second fabric attachable to said flange, a clamping member attachable to a vehicle part, and a plurality of flanges on said clamping member adapted for fastening the other end of said second fabric therebetween.

2. In a device of the character described, in combination, a resistance means having an arm, a clamp adapted for attachment to a vehicle, a drag link, means for connecting said clamp and said arm through the medium of said drag link, including a flexible resilient fabric lying perpendicular the axis of said drag link.

3. In a device of the character described, in combination, a resistance means having an arm, a clamp adapted for attachment to a vehicle, flexible means for connecting said drag link to one of said parts, and a flexible resilient fabric perpendicular to said drag link, means for connecting one portion of said fabric to the drag link and one portion to the resistance arm.

4. In a device of the character described, in combination, a resistance means having an arm, a clamp adapted for attachment to a vehicle, a drag link and a resilient flexible fabric perpendicular to said drag link, means for connecting one portion of said fabric with said drag link and means for connecting another portion thereof with said bracket, and a similar fabric also perpendicular to the drag link and similarly connecting the drag link with the resistance arm.

5. A device of the character described including, in combination, a shock absorbing unit, a shock transmitting element and a longitudinally flexible connecting member extending between said unit and element, the line of thrust of said element being substantially parallel to the path of flex of said member.

6. In a device of the character described, in combination, a shock absorbing unit, connections for connecting said unit between relatively movable parts to restrain movements therebetween, said connections including a connecting member flexible in opposite directions laterally of its normal plane and a connecting element connected between said flexible connecting member and one of said relatively movable parts so as to transmit movement restraining thrusts therebetween at opposite sides of a neutral position through said flexible connecting member, the line of said movement restraining thrusts of said connecting element being disposed transversely to the plane of said flexible connecting member when in neutral position so as to flex the latter laterally of its normal plane in opposite directions.

7. In a device of the character described, in combination, a shock absorbing unit, connections for connecting said unit between relatively movable parts to restrain movements therebetween, said connections including a connecting member flexible in opposite directions laterally of its normal plane and a connecting element connected between said flexible connecting member and one of said relatively movable parts so as to transmit movement restraining thrusts therebetween at opposite sides of a neutral position through said flexible connecting member, the line of said movement restraining thrusts of said connecting element being disposed transversely to the plane of said flexible connecting member when in neutral position so as to flex the latter laterally of its normal plane in opposite directions, said flexible connecting member having connections at spaced parts thereof limiting its lateral flexure in opposite directions.

CLIFFORD E. DUNN.